United States Patent [19]

Chang

[11] 4,264,254
[45] Apr. 28, 1981

[54] ARTICLE TRANSFER APPARATUS

[75] Inventor: Benjamin J. Chang, Indianapolis, Ind.

[73] Assignee: RCA Corporation, New York, N.Y.

[21] Appl. No.: 105,112

[22] Filed: Dec. 19, 1979

[51] Int. Cl.³ .............................................. B65G 57/04
[52] U.S. Cl. ........................................ 414/27; 29/241;
29/433; 82/1.1; 369/202
[58] Field of Search ................ 414/27, 908; 274/10 S;
29/241, 433

[56] References Cited

U.S. PATENT DOCUMENTS

| | | | |
|---|---|---|---|
| 4,062,547 | 12/1977 | Dorren | 274/10 S |
| 4,125,264 | 11/1978 | Reiss | 274/1 R |
| 4,168,836 | 9/1979 | Weinberg et al. | 274/10 S |
| 4,201,505 | 5/1980 | Gerhart et al. | 414/27 |

Primary Examiner—Robert W. Saifer
Attorney, Agent, or Firm—Samuel Cohen; William Squire

[57] ABSTRACT

A transfer arm includes a magnet which can be placed in alignment with the spindle aperture of a recording disc. A spindle is mounted to a support at a stacking station for receiving the aperture of the disc on the transfer arm when the disc is released. The extended tip of the spindle includes a swivel member made of magnetic material which is placed in alignment with the disc aperture by the magnetic field produced by the magnet. The disc is then released from the arm at the stacking station and slips over the aligned swivel tip onto the spindle for stacking.

11 Claims, 5 Drawing Figures

ARTICLE TRANSFER APPARATUS

The present invention relates to an apparatus for transferring apertured articles such as recording discs ("records") from one station to another.

In a system known within RCA for the manufacture of recording discs, after the disc is molded, it is placed on a transfer arm which swings in a horizontal plane. The arm moves the disc to a trim station at which the disc is dropped onto a turntable, the turntable spindle passing through the disc's central aperture. As the turntable rotates, the disc is trimmed to remove from its edges flashing (unwanted material resulting from the molding process) and other extraneous matter. The turntable is then raised until the disc comes into contact with a pair of suction cups on the transfer arm. The turntable is then lowered and the arm moves the disc to a stacking position. There the disc is dropped onto a stack, the stacking spindle passing through the aperture of the disc.

The stacking spindle is relatively long to permit a relatively large number of recording discs to be stored. However, because of its length, the spindle tends to become bent and, when bent, the apertures of the discs dropped onto the stack by the transfer arm may not align with the spindle. The apparatus being relatively automatic, close attention by an operator is required to prevent discs which do not become engaged by the spindle from spewing about. Further, the spindle must be realigned periodically and this consumes valuable labor in an otherwise automatic process.

Apparatus in accordance with the present invention for transferring and receiving an apertured article includes article transfer means for carrying the article to a receiving station and includes means for producing a magnetic field and for placing the article aperture in the field when the article is secured to the transfer means. Article receiving means at a receiving station include aperture receiving means and a tiltable member of magnetic material on the aperture receiving means. The tiltable member is positioned to be placed in the magnetic field when the carried article is at the receiving station, thereby tilting the member into alignment with the carried article aperture.

Figure 1:
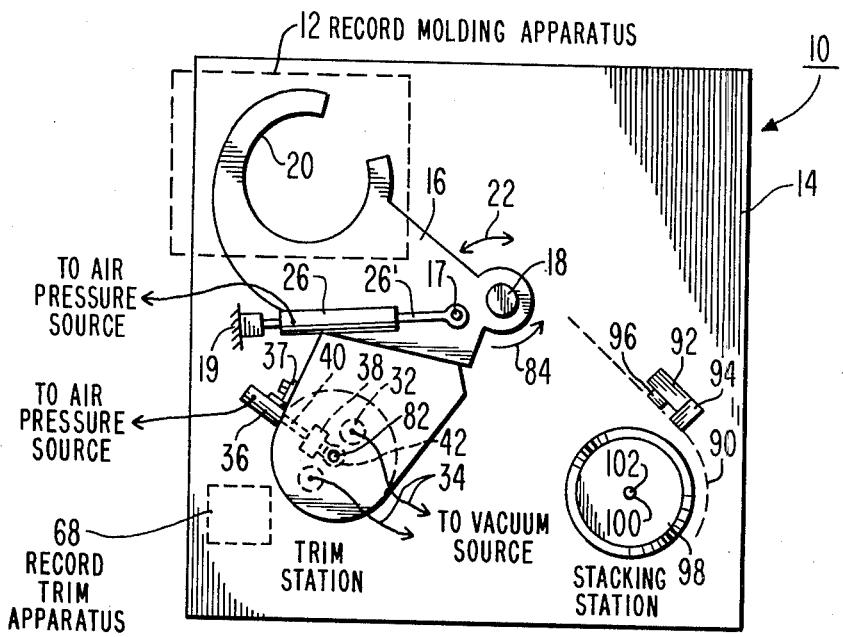
FIG. 1 is a plan view of an apparatus embodying the present invention.

In FIG. 1 a vinyl recording disc manufacturing apparatus 10 includes a conventional disc molding apparatus 12 (dashed). Apparatus 12 is adjacent base 14. Molding apparatus 12 does not form any part of the present invention and is illustrated in dashed line to indicate its relative position in the disc manufacturing apparatus 10. A record transfer arm or plate 16 is secured to shaft 18. Arm 16 includes a disc carrying recess 20, which operates in a conventional manner, and a second part 21 for receiving the records after they are trimmed, as will be described. The recess 20 receives and carries the disc from the molding apparatus 12. The recess 20 also includes apparatus for releasing the disc at the trim station. The shaft 18 moves plate 16 along a horizontal path around the shaft 18 axis, the direction of movement being indicated by arrows 22.

Figure 2:
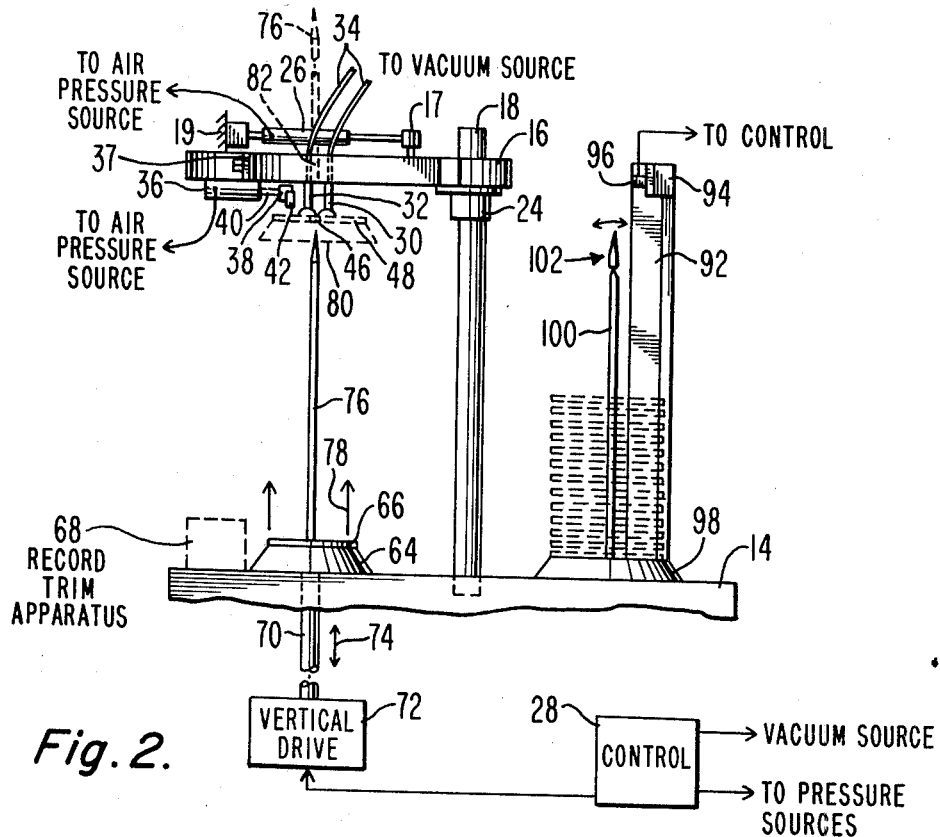
FIG. 2 is a partial schematic diagram and a side elevation view of the apparatus of FIG. 1.

In FIGS. 1 and 2 shaft 18 supports plate 16 via sleeve 24. Shaft 18 is rotated in directions 22 by air cylinder 26 operated by a source of air pressure (not shown) via control 28. Shaft 26' of cylinder 26 is pivotally connected to plate 16 at 17. The cylinder 26 is secured to a support 19. Cylinder 26 may in the alternative include, for example, an air operated cylinder connected to either gears or linkages for rotating the shaft 18. Also, other plate 16 rotating mechanism may be attached to the plate 16 for rotating plate 16 in directions 22. Such other mechanisms may include air driven solenoids or other drive devices connected directly to the plate 16 or shaft 18.

Figure 3:
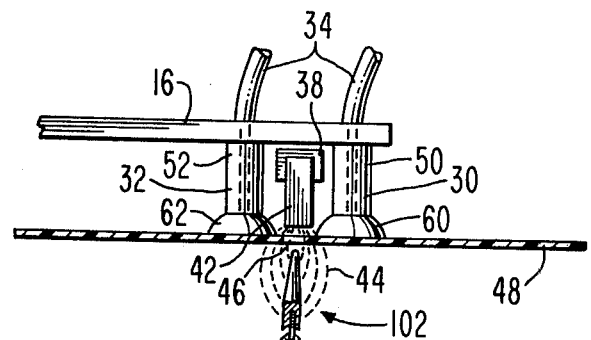
FIG. 3 is a partial sectional side elevational view of the article stacking station of FIG. 2.
Figure 3:
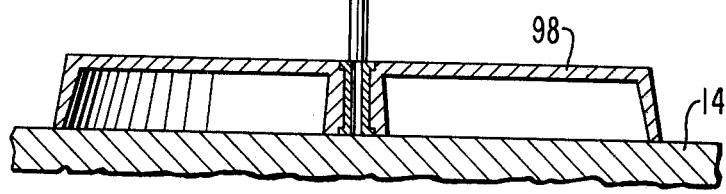

Plate 16 is placed above the surface of base 14 a distance of about 1 foot. The portion 21 of the arm 16 includes, mounted to the underside of plate 16, a pair of disc gripping suction devices 30 and 32. In FIG. 3, the suction devices 30 and 32 include supports 50 and 52, respectively, and rubber suction cups 60 and 62, respectively, secured at the support lower ends. Conduits 34 couple a source of vacuum (not shown) to the suction cups 60 and 62 for releaseably securing disc 48 thereto. Control 28 operates that source of vacuum.

In FIGS. 1 and 2, air cylinder 36 is secured to the under surface of portion 21 of plate 16 by bracket 37. A magnet attaching bracket 38 is secured to the end of actuating shaft 40 of cylinder 36. A permanent or electric magnet 42 is secured to bracket 38.

In FIG. 3 magnet 42 produces lines of flux 44 some of which pass through the disc 48 spindle aperture 46. The aperture 46 is centered within the magnetic field 44 when the shaft 40 (FIGS. 1 and 2) of cylinder 36 is in its extended position. In FIGS. 1 and 2 the shaft 40 is shown in its retracted position with magnet 42 displaced out of alignment with the aperture 46 of disc 48 and spindle 76.

In FIG. 2, mounted to base 14 is a turntable 64 on which is an in-process disc 66. Adjacent turntable 64 is a disc trim apparatus 68 (dashed) for trimming the edges of the disc 66. Apparatus for rotating the turntable 64 is not illustrated. The turntable 64 is secured to shaft 70 connected to vertical drive 72 operated by control 28. Control 28 operates the drive 72 to move the shaft 70 in vertical directions 74. This also moves the turntable 64 in directions 74. Attached to the center of the turntable 64 is an upstanding spindle 76. The spindle 76 terminates just below the disc 48 secured to the plate 16. The spindle 76 and the turntable 64 both are moved in the upward direction 78 by drive 72 to the position 80 (dashed). This causes the spindle 76 to pass through aperture 82 (FIG. 1) in the plate 16. At this time the magnet 42 is out of the way of the raised spindle 76.

In FIG. 1, after a disc is molded, it is placed in recess 20 of plate 16. The plate 16 is rotated in direction 84 until the disc in recess 20 is over the turntable 64 which is at its lowermost position and aligned therewith. In FIG. 2, a mechanism (not shown) releases the disc from the recess 20 and drops it over the spindle 76 onto turntable 64 so that it rests as illustrated by disc 66. The disc 66 is then trimmed by the apparatus 68 while the turntable 64 is rotating. While this disc is being trimmed a second disc is being molded and placed in the recess 20 which in the interim is returned to the position of FIG.

1 by control 28. At the end of the trimming cycle, turntable 64 is raised in direction 78 by drive 72 until the disc 66 engages the suction devices 30 and 32 at the dashed position of FIG. 2. The control 28 operates a vacuum source which provides a vacuum to conduits 34 to secure the disc to the suction devices. This is illustrated by disc 48 in FIG. 2 which ordinarily would not be present at this stage of the process. Plate 16 is then rotated in direction 84 (FIG. 1) until the disc carried by the suction devices 30 and 32 is aligned with the stacking station. The disc in recess 20 is concurrently positioned over the trim station and the above trim process is repeated.

When the portion 21 of the plate 16 is at the stacking station and the recess 20 is at the trim station, portion 21 is at the position 90, FIG. 1 (dashed). A vertical post 92 secured on base 14 carries a stop 94 which locates and stops plate 16 at the stacking station. Also secured to the post 92 is a limit switch 96 which is activated by portion 21. This operates control 28 for some of the various functions of the machine in the process.

At the stacking station, a disc support table 98 is mounted on base 14. A centrally positioned spindle 100 is mounted on the table 98. At the upper end of the spindle 100 is a swivel tip assembly 102.

Figure 5:
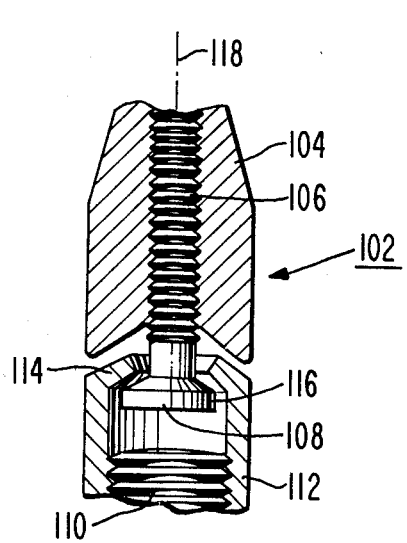
FIG. 5 is an enlarged sectional view of the captivating portion of the moveable spindle of FIG. 4.
Figure 4:
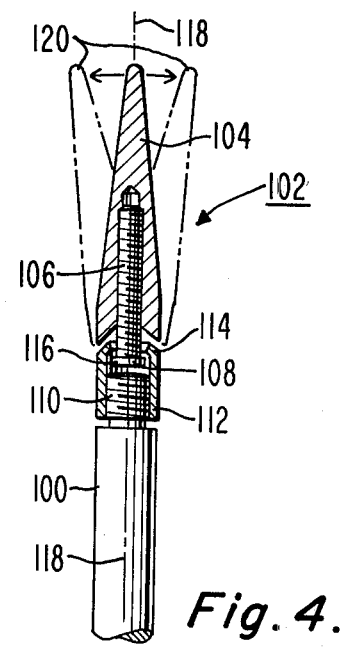
FIG. 4 is an enlarged partial sectional view of the moveable spindle portion of the apparatus of FIG. 3.

In FIGS. 4 and 5, the assembly 102 includes a pointed tip member 104 to which is screwed a cap screw 106 having a cap 108. The end of spindle 100 is threaded at 110. A sleeve 112 is threaded to threads 110. Sleeve 112 includes a flange 114. Flange 114 extends radially inwardly and upwardly to form a frustro-conical flange. The cap 108 has a radially outwardly extending flange 116 complementing and captured by flange 114. Cap 108 fits somewhat loosely within the sleeve 112 so that it may swivel about the axis 118 of the spindle as shown by the broken line at 120, FIG. 4. The tip 104 may swivel in any azimuth direction about the axis 118. The tip 104 is made of magnetic material such as iron.

When the plate 16 is driven in direction 84 by air cylinder 26, FIG. 1, to position 90, air pressure is supplied to the air cylinder 36 via control 28. In FIG. 2, this latter action moves the cylinder 36 shaft 40 to its extended position which places magnet 42 directly above disc 48 aperture 46. At this time the magnetic field 44 (FIG. 3) surrounds the tip 102 regardless of its position or angular orientation and, due to the magnetic force of the magnetic field, the tip is swiveled and pointed toward the magnet 42. Because the position of the magnet 42 is mechanically controlled by the air cylinder 36, magnet 42 is centrally positioned over and aligned with the aperture 46 of the disc 48 by cylinder 36. Thus, the tip assembly 102 is automatically pointed toward the aperture 46 for each and every disc that is processed.

Control 28, via suitable timing circuits, then actuates the vacuum source (not shown), to remove the vacuum and supply air pressure to devices 30 and 32 via the conduits 34. This air pressure causes the suction devices 30 and 32 to release the disc 48 which is over the stacking station. At this point the disc 48 drops by gravity, the spindle 100 aligning with the discs aperture 46 and guiding the disc onto the stack. The alignment of the spindle tip assembly 22 with the aperture 46 is assured by the magnetic field. It moves the tip to to the desired position even though the spindle body may be somewhat bent.

After the disc 48 is dropped onto the table 98, plate 16 rotates clockwise (as viewed in FIG. 1) to return to the position shown in FIG. 1 where it receives a new disc in recess 20 from the molding apparatus 12 and where a finished disc from the trim station is secured to the suction devices 30 and 32 beneath portion 21, as described above. The plate 16 then is rotated counterclockwise (in direction 84 of FIG. 1) and the process repeated. The spindle 100 may be approximately one foot long and can store over 100 records. Thus, any damage to the spindle 100 at the stacking station, FIG. 2, is compensated for by the swivel tip assembly 102, therefore requiring less operator attention.

What is claimed is:

1. An article transfer apparatus comprising:
   article transfer means for carrying an article to a receiving station,
   means secured to said transfer means for producing a magnetic field,
   means for releaseably securing an apertured article to said transfer means,
   means for placing the article aperture in said field,
   article receiving means at said station including aperture receiving means, and
   a tiltable member of magnetic material on said aperture receiving means and positioned to be placed in said field when the carried article is at said station thereby tilting said member into alignment with said carried article aperture.

2. The apparatus of claim 1 wherein said aperture receiving means includes an upstanding rod and said member includes a pointed tip member pointing toward said means for producing a magnetic field.

3. The apparatus of claim 2 wherein said tip member includes a tip portion and a securing portion, said securing portion including a depending member having a radially outwardly extending flange, said rod including a hollow cylindrical end portion with a radially inwardly extending lip, said lip and flange being interlocked.

4. The apparatus of claim 2 wherein said tip member and rod includes means for rotatably securing said tip member to said rod.

5. The apparatus of claim 2 wherein said rod extends along a given axis, said tip member being positioned at one end to said rod on said axis, the extended end of said tip member being tiltable with respect to said axis in any azimuth position about said rod.

6. The apparatus of claim 1 wherein said transfer means includes means for transporting a disc shaped article, said aperture being positioned centrally in said discs.

7. The apparatus of claim 1 wherein said means for producing a magnetic field includes a magnet.

8. The apparatus of claim 1 wherein said means for placing the aperture in said field includes actuating means connected to (1) said transfer means and (2) said means for producing a magnetic field for moving said latter means between a neutral position with the aperture outside the field and a second position in which the aperture is in said field.

9. Apparatus including article transfer means for releaseably securing an apertured article thereto and for placing said article on a receiving member at a receiving station, said receiving member including a rod for insertion in the article aperture during the receiving, said rod tending to be misaligned with said aperture during said receiving, the improvement wherein said transfer means includes magnet means and means for aligning the field of said magnet means with the article aperture, and a moveable tip secured to the end of the rod and made of magnetic material, said tip being responsive to said magnetic field so that the tip moves in alignment with said aperture when in said field, said tip being located on said rod so it is in said field when said transfer means is at said receiving station.

10. The apparatus of claim 9 wherein said transfer means includes means for releaseably securing a recording disc thereto, said receiving station including means for receiving and stacking a plurality of said discs on said rod.

11. In a system for stacking records, each with a central aperture, at a stacking station with a vertical spindle thereat, by moving the record by means of a transfer arm until the record is in position over the stacking station with the aperture therein aligned with the spindle and then dropping the record so that it slides down the spindle, an improved arrangement for insuring that the spindle end is aligned with the aperture in the record before the record is dropped comprising:

the spindle including an end portion which is formed of magnetic material and which is loosely joined to the remainder of the spindle so that it can be moved to different positions; and magnet means on the transfer arm for producing a magnetic field within which the aperture in a record is centered, when said record is moved into position over the stacking station, for causing said end portion of the spindle to align with the aperture before the record is dropped.

* * * * *